United States Patent [19]

Merino

[11] Patent Number: 4,773,555

[45] Date of Patent: Sep. 27, 1988

[54] CHAFING DISH COVER HOLDER

[76] Inventor: Carlos Merino, 531 Casselman St., Chula Vista, Calif. 92010

[21] Appl. No.: 112,448

[22] Filed: Oct. 26, 1987

[51] Int. Cl.⁴ .......................... B65D 6/12; B65D 6/40; B65D 25/00
[52] U.S. Cl. ................................. 220/85 CH; 220/379
[58] Field of Search .......................... 220/85 CH, 379; 126/25 R

[56] References Cited

U.S. PATENT DOCUMENTS

| 471,565 | 3/1892 | Nourse | 220/379 |
| 2,541,604 | 2/1951 | Normandin | 220/85 CH |
| 2,808,175 | 10/1957 | Aiken | 220/85 CH |
| 4,523,574 | 6/1985 | Schlosser | 220/379 |

Primary Examiner—George T. Hall
Attorney, Agent, or Firm—Charles C. Logan, II

[57] ABSTRACT

A chafing dish cover holder that is detachably supported on one of the horizontal side members of a chafer support frame. The chafing dish cover holder has an elongated upright oriented plate member having a flange extending downwardly from its top edge to allow it to be supported on the horizontal side member of the chafer support frame. A pair of chafer cover support arm assemblies extend from the top edge of the plate member and these form a resting position for the cover of a chafer when the cover is removed and oriented in an upright position.

5 Claims, 2 Drawing Sheets

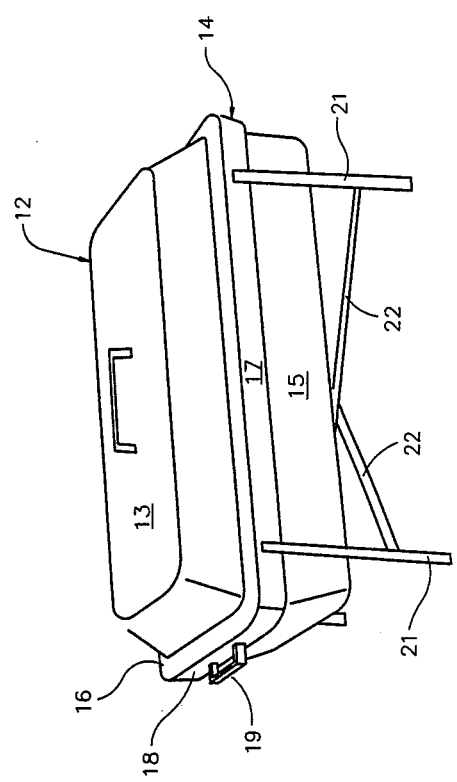
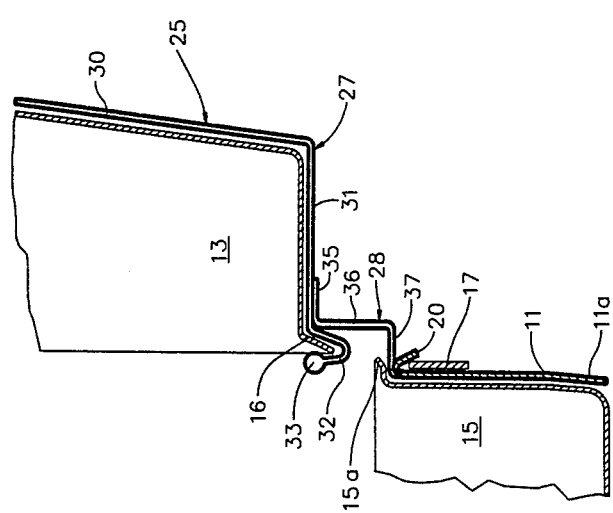
FIGURE 2
FIGURE 1

CHAFING DISH COVER HOLDER

BACKGROUND OF THE INVENTION

The invention relates to a chafer and more specifically to a structural member that has been designed to hold the cover of the chafer in an upright orientation after it has been removed from the top of the tray of the chafer.

Presently most chafers are utilized by restaurants, caterers, and hotels. Hot food is placed in the trays of the chafers and when it is time for the food to be served the cover of the chafer is removed. The problem posed at this time is where or what to do with the cover. This type of problem is not very important when the chafer is utilized in an individuals home, but where a serving table in a restaurant might be thirty or forty feet long and being covered with numerous chafers, there is a problem as to where to store the cover.

It is an object of the invention to provide a novel structure for storing the cover of a chafer after the food in its tray has been uncovered.

It is also an object of the invention to provide a novel device which is detachably secured to the chafer support frame so that it may be individually sterilized.

It is another object of the invention to provide a novel device such as applicant's chafing dish cover holder which will hold the cover of the chafer in an upright orientation.

It is an additional object of the invention to provide a novel chafing dish cover holder that is economical to manufacture and market.

It is a further object of the invention to provide a novel chafing dish cover holder that is easy to attach and detach from the chafer support frame.

SUMMARY OF THE INVENTION

Applicant's novel chafing dish cover holder is a one piece member that is preferably made from stainless steel material. It has an elongated upright oriented flat plate member having a predetermined length with a downwardly extending flange from its top edge. The plate member and its flange rest on one of the horizontal side members of the chafer support frame. Attached to the top edge of the plate member are a pair of longitudinally spaced chafer cover support arm assemblys. Each of these support arm assemblys has a primary arm member and a secondary arm member that are fixedly secured to each other. The primary arm member has an upright portion whose bottom end is connected to one end of a horizontal portion. The opposite end of the horizontal portion has a U-shaped portion. The cover of the chafer is nested or cradled in the primary arm member with the cover being oriented upright such that its lip is received in the U-shaped portion. One of the side walls of the cover rests on the horizontal portion while its top wall would rest against the upright portion.

The chafing dish cover holder has no moving parts nor does it have any areas where food particles could be trapped. It is quickly and easily detachable from the chafer support frame and its size makes it easy to wash and sterilize in a dishwasher.

DESCRIPTION OF THE DRAWINGS

FIG. 1 is a cross sectional view illustrating applicant's novel chafing dish cover holder and the manner in which it is supported by the chafer support frame;

FIG. 2 is a front perspective view of a conventionally designed chafer that applicant's novel chafing dish cover holder would be used with;

DESCRIPTION OF THE PREFERRED EMBODIMENT

Figure 3:
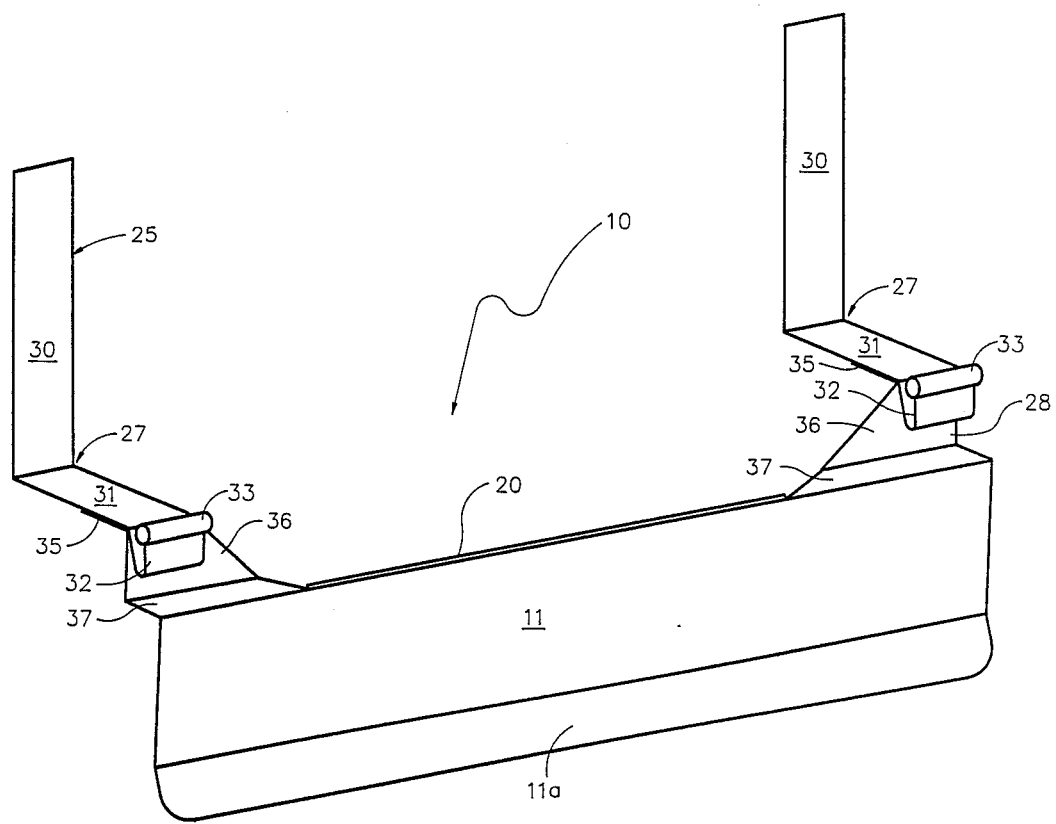
FIG. 3 is a schematic front perspective view of applicant's novel chafing dish cover holder.
Figure 4:
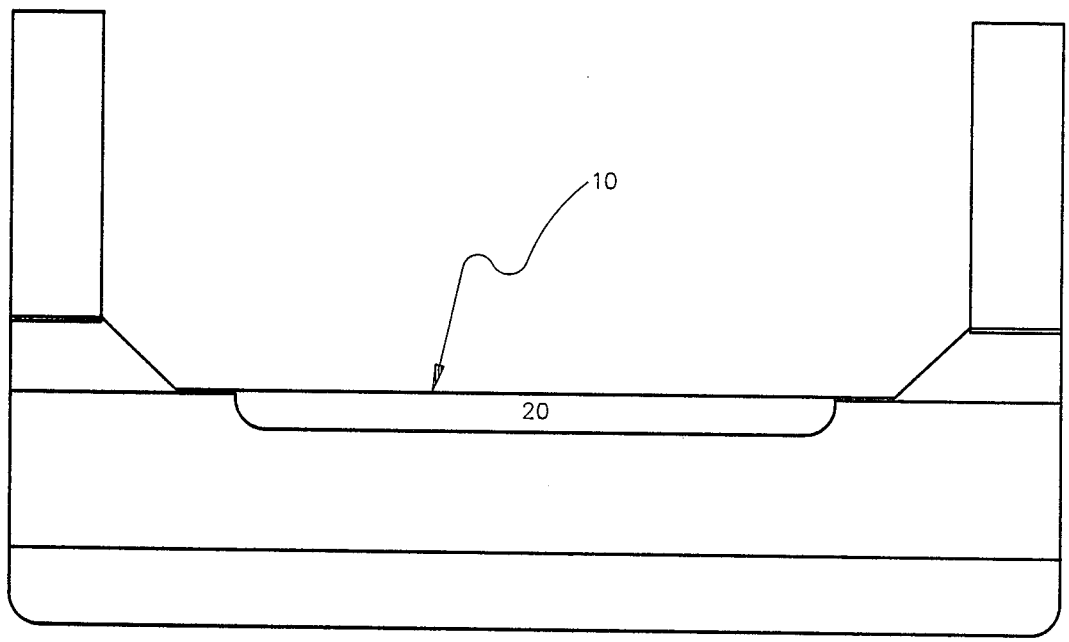
FIG. 4 is a rear elevation view of applicant's novel chafing dish cover holder.

Applicant's novel chafing dish cover holder will now be described by referring to FIGS. 1-4 of the drawings. The chafing dish cover holder is generally designated numeral 10.

In FIG. 2, a conventional chafer 12 is illustrated. It is with this type of a structure that applicant's chafer dish cover holder 10 would be utilized. Chafer 12 has a cover 13 having a lip 16 extending around its periphery. It has a chafer support frame 14 having horizontal side members 17 and horizontal end members 18. A handle 19 is attached to each of the end members 18. Tray 15 is supported within support frame 14 by its peripheral flange 15a. A plurality of legs 21 extend downwardly from support frame 14 and brace members 22 provide rigidity.

A cross-sectional elevational view is illustrated in FIG. 1 showing the manner in which cover 13 would be supported by chafing dish cover holder 10. Elongated plate member 11 would nest between horizontal side member 17 and the side wall of tray 15. Flange 20 which extends downwardly from the top edge of plate member 11 would provide a groove for receiving the top edge of horizontal side member 17. The lip 15a of tray 15 would rest on the top edge of plate member 11.

A pair of chafer cover support arm assemblys 25 are longitudinally spaced from each other and they are fixedly connected to the top edge of plate number 11. These support arm assemblys 25 each have a primary arm member 27 and a secondary arm member 28. They are welded to each other to form a unitary structure. Primary member 27 has an upright portion 30, a horizontal portion 31, a U-shaped portion 32 and a bead 33 at its tip. Secondary arm member 28 has a top horizontal portion 35, an upright portion 36, and a bottom horizontal portion 37.

What is claimed is:

1. A chafing dish cover holder comprising:
   an elongated upright oriented plate member having a predetermined length, said plate member having a longitudinal axis, said plate member having a front face, a rear face, a top edge, a left end and a right end;
   a pair of chafer cover support arm assemblys that are longitudinally spaced from each other, said cover support arm assembly being connected to the top edge of said plate member adjacent its respective left and right ends;
   said cover support arm assemblys having means for supporting the cover of a chafer in an upright position; and
   flange means on the rear face of said plate member for hooking over the horizontal side member of a chafer to thereby support said chafing dish cover holder.

2. A chafer dish cover holder as recited in claim 1 wherein said holder is made of stainless steel material.

3. A chafer dish cover holder as recited in claim 1 wherein said flange means extends substantially from one cover support arm assembly to the other cover support arm assembly.

4. A chafer dish cover holder as recited in claim 1 wherein said means for supporting the cover of a chafer in an upright position comprises a primary arm member and a secondary arm member that are fixedly secured to each other.

5. A chafer dish cover holder as recited in claim 4 wherein said primary arm member has an upright portion, a horizontal portion, a U-shaped portion for cradling the cover of a chafer which has been placed on said primary arm member in an upright orientation.

* * * * *